United States Patent [19]

Mitsuda et al.

[11] Patent Number: 4,603,060
[45] Date of Patent: Jul. 29, 1986

[54] METHOD OF MANUFACTURING AN ELECTRODE FOR A FUEL CELL

[75] Inventors: Kenro Mitsuda, Takatsuki; Ikuyuki Hirata, Ashiya; Hideaki Miyoshi, Osaka; Kuraki Kitazaki, Kawanishi, all of Japan

[73] Assignee: Mitsubishi Denki Kabushiki Kaisha, Tokyo, Japan

[21] Appl. No.: 690,526

[22] Filed: Jan. 11, 1985

[30] Foreign Application Priority Data

Jan. 20, 1984 [JP] Japan .................... 59-9323

[51] Int. Cl.⁴ .............................. H01M 4/88
[52] U.S. Cl. ................... 427/115; 427/428; 118/249; 118/261; 118/221; 118/222
[58] Field of Search ............... 427/115, 428; 118/249, 118/261, 221, 222

[56] References Cited

U.S. PATENT DOCUMENTS

| | | | |
|---|---|---|---|
| 2,970,564 | 2/1961 | Warner | 118/261 |
| 3,719,167 | 3/1973 | Pahlitzsch | 118/261 |
| 3,943,006 | 3/1976 | Baker et al. | 427/115 |
| 4,173,662 | 11/1979 | Stewart | 427/115 |
| 4,185,131 | 1/1980 | Goller et al. | 427/115 |
| 4,313,972 | 2/1982 | Goller et al. | 427/115 |
| 4,485,132 | 11/1984 | Furuzono | 118/261 |

Primary Examiner—Richard Bueker
Attorney, Agent, or Firm—Oblon, Fisher, Spivak, McClelland & Maier

[57] ABSTRACT

A method of manufacturing an electrode for a fuel cell comprises placing a coating roller opposing a feeding roller with a space through which an electrode substrate is passed, placing a doctor roller with respect to the coating roller so as to keep a space which is adjustable, arranging a paste reservoir above the doctor roller and the coating roller so that paste flows to the space between the doctor roller and the coating roller, rotating the feeding roller in a specified direction while the coating roller is rotated in the same direction as the feeding roller to transfer the paste on the electrode substrate.

1 Claim, 5 Drawing Figures

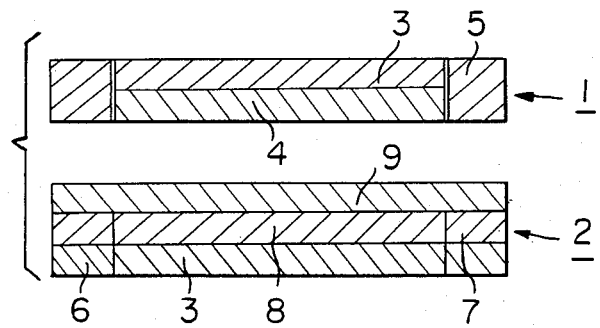
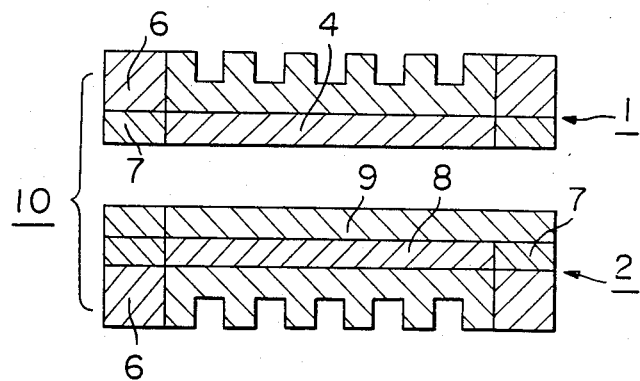
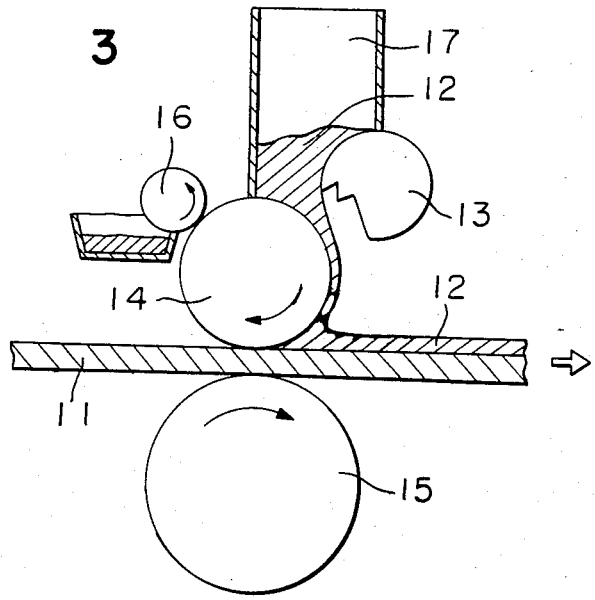

METHOD OF MANUFACTURING AN ELECTRODE FOR A FUEL CELL

BACKGROUND OF THE INVENTION

1. Field of the Invention

The present invention relates to a method of manufacturing an electrode for a fuel cell.

2. Description of Prior Art

There is widely known a fuel cell as a power generating system instead of a thermal power generation system. An electrochemical cell such as a fuel cell is constituted by a number of plied electrodes and accordingly, when any one of the electrodes becomes faulty, there causes an trouble of the cell as a whole. Accordingly, it is necessary to employ a large-scale production system for electrodes having good quality for the fuel cells.

FIG. 1 is a cross-sectional view showing a construction of the electrodes in a phosphoric acid fuel cell using carbon papers as an electrode substrate. For clarification, an air electrode 1 and a fuel electrode 2 are shown in a disassembled state in FIG. 1. The air electrode 1 is constituted by a carbon paper 3 having a thickness of ranging from 300 $\mu$m to 600 $\mu$m, a catalytic layer 4 having a thickness of ranging from about 50 $\mu$m to about 200 $\mu$m and a packing 5 made of fluorine-containing rubber. The fuel electrode 2 is constituted by a carbon paper 3 same as that of the air electrode 1, a catalytic layer 8 having a thickness of ranging from about 30 $\mu$m to about 150 $\mu$m, a wet-sealing part 6, a peripheral gas-sealing part 7 and a matrix layer 9 having a thickness of about 150 $\mu$m. The matrix layer 9 is formed integrally with the fuel electrode in the figure (although it may be formed as an independent layer) and therefore, the matrix layer 9 is considered as a part of the fuel electrode.

FIG. 2 is a cross-sectional view showing a construction of a phosphoric acid fuel cell using ribbed electrodes in which a numeral 10 designates as a whole a ribbed electrode. There are generally two types of electrodes for fuel cells inclusive of a phosphoric acid type fuel cell and the other types of fuel cells.

Heretofore, there have been proposed various methods to manufacture the electrodes. A spraying method have been generally used as the most simple way. Namely, the spraying method comprises coating a solution including a fairly small amount of solid content on substrates which constitute the peripheral sealing layer 7, the catalytic layers 4, 8 and the matrix layer 9 and drying the solution, the step being repeated several times until the thickness of dried solid content reaches a predetermined level. However, the spraying method has the disadvantage that many steps are required and a large amount of paste is wasted and accordingly it is difficult to carry out a large-scale production and therefore not economical.

A screen-printing method has also been utilized. However, it requires many steps of hand operations and it is difficult to utilize the method for production of a large-sized electrode suitable for practical use and the method is not suitable for a large-scale production.

A drying method has been utilized to form the catalytic layers 4, 8 shown in FIG. 2. However, a large amount of paste has been wasted and therefore, the drying method is uneconomical as is the spraying method. Particularly, an phosphoric acid fuel cell requires relatively large amount of platinum for the electrode. Accordingly, an amount of paste to be used should be minimized as much as possible.

Thus, the conventional methods are uneconomical and are not suitable for a large-scale production. Further, in either conventional method, it is necessary to form the catalytic layers 4, 8 and the peripheral sealing layer 7 separately which inevitably requires many steps. Accordingly, a method for economical and large-scale production with an automation system is desired to manufacture an electrode for a phosphoric acid fuel cell which is expected to be in use in the near feature.

The inventors have studied to use at first a doctor blade method; however, it has been found that use of a reverse roll coating method is advantageous from the viewpoint of easy control of the thickness of layers.

SUMMARY OF THE INVENTION

It is an object of the present invention to eliminate the disadvantage of the conventional method and to provide a method of manufacturing an electrode for a fuel cell which is economical and allows a large-scale production with an automation system.

The foregoing and the other objects of the present invention have been attained by providing a method of manufacturing an electrode for a fuel cell which comprises placing a coating roller opposing a feeding roller with a space through which an electrode substrate is passed, placing a doctor roller with respect to the coating roller so as to keep a space which is adjustable, arranging a paste reservoir above the doctor roller and the coating roller so that paste flows to the space between the doctor roller and the coating roller, rotating the feeding roller in a specified direction while the coating roller is rotated in the same direction as the feeding roller to transfer the paste on the electrode substrate.

BRIEF DESCRIPTION OF DRAWING

In the drawing:

FIG. 1 is a cross-sectional view showing a construction of an electrode in which a carbon paper is used as an electrode substrate for a fuel cell;

FIG. 2 is a cross-sectional view showing a construction of an electrode in which a ribbed electrode substrate is used;

FIG. 3 is a diagram in cross-section of an apparatus for manufacturing an electrode according to a method of the present invention;

DETAILED DESCRIPTION OF PREFERRED EMBODIMENT

Figure 4:
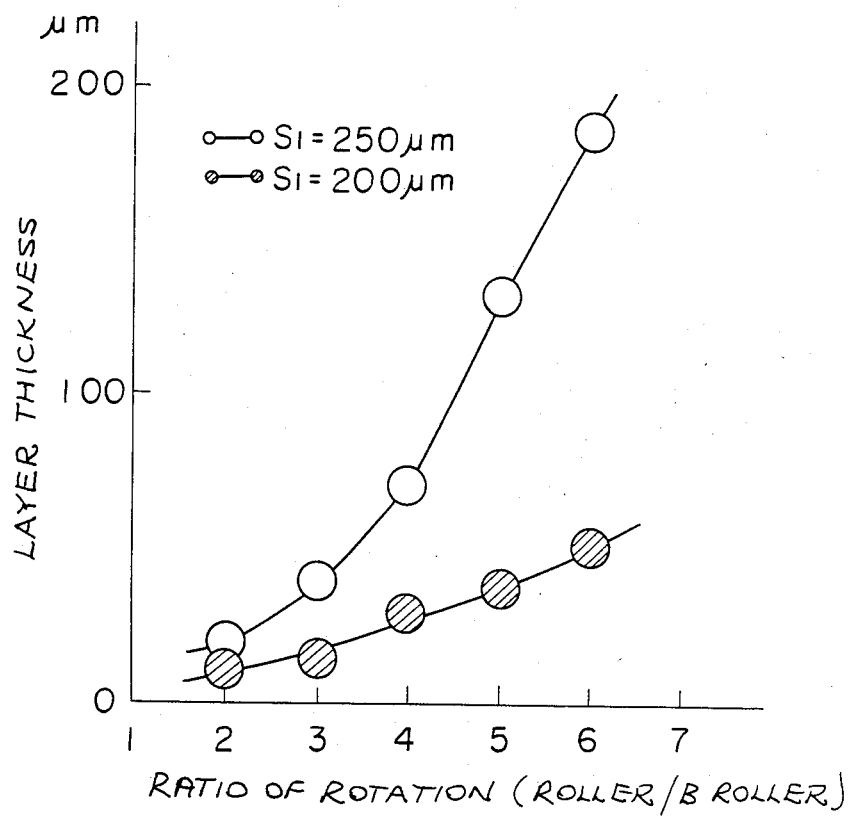
FIG. 4 is a characteristic diagram showing variations of the thickness of a catalytic layer when a space between a doctor roller and a coating roller and the ratio of rotation of the coating roller to the feeding roller are changed, in which the ordinate represents layer thickness and the abscissa represents the ratio of rotation.

An embodiment of the present invention will be described with reference to drawing. FIG. 3 is a cross-sectional view showing an embodiment of the apparatus used for manufacturing an electrode for a fuel cell of the present invention.

In FIG. 3, a feeding roller 15 (referred to as a B roller hereinbelow) is horizontally held and is rotated in a specified direction and a coating roller 14 (referred to as a C roller) is placed above the B roller 15 in parallel to it with a predetermined space through which an electrode substrate 11 is passed. The C roller 14 is rotated in the same direction as the B roller 15. A paste reservoir 17 for holding paste 12 is positioned above the C roller 14. A doctor roller 13 (referred to as a D roller) is positioned below the paste reservoir 17 to restrict the follow passage of the paste 12 which flows from the paste reservoir 17 due to the gravity. The D roller 13 is placed in position after adjustment of the distance between the C roller 14 and the B roller 15. When the C roller 14 is rotated, the paste 12 is drawn from the paste reservoir 17 to be coated on the electrode substrate 11 transferred by the rotation of B roller 15. A cleaning roller 16 is rotated in contact with the C roller 14 so as to remove the paste remaining on the circumferential surface of the C roller 14 without being transferred to the substrate 11. The thickness of the paste on the substrate 11 can be easily adjusted by selecting the space $S_1$ between the D roller 13 and the C roller 14 and the ratio of rotation of the C roller 14 to the B roller 15. A preferred space $S_1$ is in the range from 100 $\mu m$ to 300 $\mu m$ and a preferred ratio of rotation is in the range from 1 to 6. A way of rotating the C roller and the B roller in the same direction is utilized to provide a uniform thickness of 100 $\mu m$ or more. The title of the reverse roll coating method is derived from the fact that the coating roller is rotated in the direction opposite to the direction feeding the substrate. A doctor-blade-like edge formed in the D roller 13 allows formation of uniform layer of paste on the C roller 14. Further, since the substrate 11 is in a form of cut plate in the embodiment, the B roller 15 is so designed that it is movable in the vertical direction when the substrate 11 is introduced and transferred.

Three experiments to apply the paste on the substrate are conducted by using the above-mentioned apparatus.

Experiment 1

(Application of a Catalytic Layer)

Carbon powder was used instead of a catalyst and an imitative catalytic paste of water-alcohol mixed solvent including 19.2% by weight of solid content (50% by weight of the solid content is polytetrafluoroethylene) was prepared. (An amount of platinum as a catalyst is relatively small, the physical property of the imitative catalytic paste is substantially the same as the actual catalytic paste.) The main purpose of the experiment was to confirm accuracy in control of the thickness of the catalytic layer after drying. Carbon paper (300 mm × 600 mm) undergone water-repellent treatment was used as a substrate. A catalytic layer was formed on the carbon paper by changing the space $S_1$ (space between the D roller and the C roller) and the ratio of rotation (of the C roller to the B roller). The carbon paper with the catalytic layer was baked at 350° C. and the layer thickness thus obtained was studied. The detail is shown in FIG. 4. In FIG. 4, the ordinate represents layer thickness after baking and the abscissa represents the ratio of rotation of the C roller to the B roller. As apparent from the FIG. 4, it was found that the catalytic layer having the thickness of nearly 200 $\mu m$ can be obtained by adjusting the space $S_1$ and the ratio of rotation. In FIG. 4, there is convergence of two lines at a region of small rotation ratio because there takes place impregnation of small amount of the catalytic paste into the substrate. Further, presence of unevenness in the layer thickness of about 10 $\mu m$ is derived from unevenness in the surface of the substrate and unevenness of the layer thickness in a wet state is less than 5 $\mu m$ or less. Accordingly, the coating operation is performed twice including the primary coating operation in order to provide uniform layer thickness (one coating operation is insufficient). In the experiment, the speed of feeding the substrate was 1 m/min. It, however, is possible to increase the feeding speed.

In the next step, a catalytic paste was prepared by using platinum and the catalytic layer was formed on the carbon paper under the condition of $S_1 = 250$ $\mu m$ and the ratio of rotation being 5, followed by baking it at 350° C. A single cell of 100 cm$^2$ was prepared by using the baked carbon paper as an air electrode. It was confirmed that there is no problem with respect to properties and the life time.

Finally, an experiment for coating a catalytic layer by using a ribbed electrode substrate (150 mm × 150 mm × 2.5 mm) under the condition of $S_1 = 250$ $\mu m$ and the ratio of rotation being 5 was carried out. In the experiment, it was confirmed that coating operation can be performed without any damage of the substrate.

In the series of the Experiment 1, it was found that the catalytic layer could be formed at a speed as high as 1 m/min or more at one or two steps and the layer thickness was arbitarily determined by controlling $S_1$ and the ratio of rotation.

Experiment 2

(Simultaneous Coating Operation for a Peripheral Sealing Layer and a Catalytic Layer)

The inventors have found that it is possible to simultaneously coating a peripheral sealing layer and a catalytic layer by putting two partition plates in the direction of feeding the substrate between the C roller and the D roller.

Figure 5:
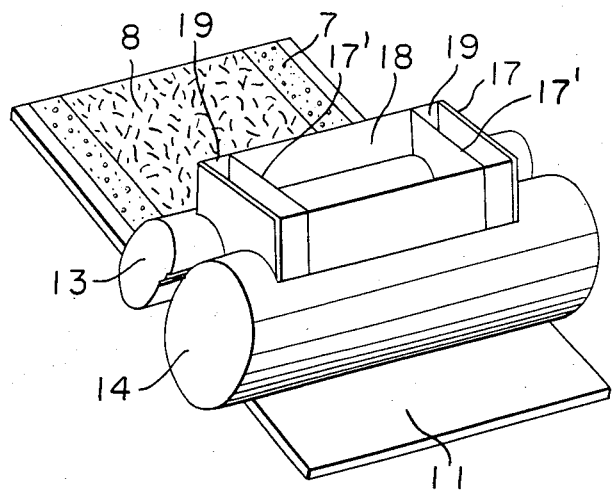
FIG. 5 is a perspective view showing an apparatus for manufacturing an electrode according to another embodiment of the present invention.

FIG. 5 is a perspective view showing an embodiment of the apparatus for carrying out simultaneous coating operation according to the present invention. In FIG. 5, the paste resevoir 17 is divided by two partitions 17' in the direction of feeding the substrate 11 into the central reservoirs for catalytic paste 18 and resevoirs for peripheral sealing paste 19 at both ends of the reservoir 18. In this experiment, the imitative catalytic paste used in the Experiment 1 and a paste including powder of silicon carbide as a paste for peripheral sealing layer were put in the apparatus. The paste for the peripheral sealing layer was so formulated that it had substantially the same solid content as the imitative catalytic paste whereby the thickness of the peripheral sealing layer was the same as the catalytic layer after drying. In the experiment, our concern was directed to mixing of the peripheral sealing paste with the catalytic paste. However, the mixing of the two pastes on the C roller 14 was prevented by giving the thickness of the partition plate 17' to be about 1 mm. Further, it was found that there was almost no gap between the two pastes when they were coated on the substrate 11. The feeding speed of the substrate was 1 m/min in the experiment. However, uniform layer thickness could be obtained in an increased speed. In the conventional technique, it was impossible to conduct simultaneous coating operation to the peripheral sealing layer and the catalytic layer and therefore coating operations were performed independently. Considerable time and skillful technique were required to coincide the position of the peripheral sealing layer and the catalytic layer. Accordingly, the simultaneous coating operation at a high speed is very significant.

Experiment 3

(Coating Operation for a Matrix Layer)

A paste including powder of silicon carbide was used as a paste for a matrix layer and the paste was coated on the substrate which was baked at 315° C. after having conducted Experiment 2. The same principle as the coating operation for the catalytic layer in Experiment 1 is applicable to the matrix layer and the layer thickness can be controlled as desired by controlling the space $S_1$ and the ratio of rotation. Although there has been utilized a curtain-coating method as a large-scale production method for coating the matrix layer, use of a reverse roll coating method is advantageous because the paste can be efficiently utilized.

Thus, the Experiments as above-mentioned revealed that the reverse roll coating method is superior to any of methods of coating the peripheral sealing layer 7, the catalytic layers 4, 8 and the matrix layer 9 by using construction of electrodes shown in FIGS. 1 and 2. When the substrate is fed at a speed of 1 m/min, time required for coating operations is 2 minutes for the catalytic layer (including one time of primary coating operation); 2 minutes for simultaneous coating operations for the peripheral sealing layer and the catalytic layer and 1 minute for coating the matrix layer, when an area of 1 m² is to be coated. Accordingly, the total time for coating, namely time for one cell is 4 minutes in which it requires 3 minutes for the fuel electrode and 2 minutes for the air electrode. It was impossible for the conventional method to carry out coating operation in such a short time. Further, the reverse roll coating method is economical because of a little amount of wasted paste.

When the method of the present invention is applied to a flat smooth film, but not an electrode substrate, further smooth coating layer can be obtained to allow smooth continuous operations. Accordingly, it is advantageous from the economical viewpoint of the transfer on the electrode substrate after the paste has been once coated on a film. In this case, before the matrix layer is formed on the film the catalytic layer is coated or the peripheral sealing layer and the catalytic layer are simultaneously coated. Then, the layers are sequentially transferred on the electrode substrate by means of a roller press. This method provides further smooth coating surface in comparison with a method of direct coating of the electrode substrate having a rough surface.

What is claimed is:

1. A method of manufacturing an electrode for a fuel cell which comprises placing a coating roller opposing a feeding roller with a space through which an electrode substrate is passed, placing a doctor roller with respect to said coating roller so as to keep a space which is adjustable, arranging a paste reservoir above said doctor roller and said space between said doctor roller and said coating roller wherein said paste reservoir is provided with at least one partition part in the direction of feeding said electrode substrate, rotating said feeding roller in a specified direction while said coating roller is rotated in the same direction as said feeding roller to transfer said paste on said electrode substrate.

* * * * *